(12) United States Patent
Oxley et al.

(10) Patent No.: US 12,330,006 B2
(45) Date of Patent: Jun. 17, 2025

(54) POLYMER IMMOBILIZATION MATRIX FOR CONTAINMENT OF HAZARDOUS MATERIALS AND METHODS OF USING THE SAME

(71) Applicant: University of Rhode Island Board of Trustees, Kingston, RI (US)

(72) Inventors: Jimmie Oxley, Narragansett, RI (US); James L. Smith, Narragansett, RI (US); Robert Ichiyama, Kingston, RI (US); Gerald Kagan, Foxboro, MA (US)

(73) Assignee: University of Rhode Island Board of Trustees, Kingston, RI (US)

( * ) Notice: Subject to any disclaimer, the term of this patent is extended or adjusted under 35 U.S.C. 154(b) by 90 days.

(21) Appl. No.: 18/056,845

(22) Filed: Nov. 18, 2022

(65) Prior Publication Data

US 2023/0144468 A1 May 11, 2023

Related U.S. Application Data

(62) Division of application No. 16/817,770, filed on Mar. 13, 2020, now abandoned.
(Continued)

(51) Int. Cl.
*A62D 3/33* (2007.01)
*A62D 3/02* (2007.01)
(Continued)

(52) U.S. Cl.
CPC ............... *A62D 3/33* (2013.01); *A62D 3/02* (2013.01); *C08L 101/08* (2013.01);
(Continued)

(58) Field of Classification Search
CPC ........ A62D 3/33; A62D 3/02; A62D 2101/06; A62D 2101/20; C08L 101/08; C08L 2312/00
See application file for complete search history.

(56) References Cited

U.S. PATENT DOCUMENTS

| 4,349,470 A | 9/1982 | Battista |
| 6,140,475 A | 10/2000 | Margolin et al. |
| (Continued) |

FOREIGN PATENT DOCUMENTS

| CN | 106087541 A | 11/2016 |
| CN | 107175083 A | 9/2017 |
| (Continued) |

OTHER PUBLICATIONS

Beppu et al. "Crosslinking of chitosan membranes using glutaraldehyde: Effect on ion permeability and water absorption" Journal of Membrane Science, vol. 301, Issues 1-2, Sep. 2007, pp. 126-130. (Year: 2007).*
(Continued)

*Primary Examiner* — Robert S Walters, Jr.
(74) *Attorney, Agent, or Firm* — Hinckley Allen & Snyder; Stephen Holmes

(57) ABSTRACT

The present disclosure describes a unique, two-part, water-soluble polymer matrix material and a method of application that immobilizes a wide variety of loose powder or crystalline hazardous materials and renders them "safe" or at least "safer" for handling and transport. The polymer matrix material is a two-part polymer material comprising a liquid cross-linking polymer and a cross-linking agent, initiator, or biocide contained in a solution. The cross-linking agent functions to cross-link the polymer and cause it to harden in place.

22 Claims, 5 Drawing Sheets

Related U.S. Application Data

(60) Provisional application No. 62/837,520, filed on Apr. 23, 2019.

(51) Int. Cl.
*C08L 101/08* (2006.01)
*A62D 101/06* (2007.01)
*A62D 101/20* (2007.01)

(52) U.S. Cl.
CPC ...... *A62D 2101/06* (2013.01); *A62D 2101/20* (2013.01); *C08L 2312/00* (2013.01)

(56) References Cited

U.S. PATENT DOCUMENTS

| | | | |
|---|---|---|---|
| 9,458,419 B2 * | 10/2016 | Edgington | ........... C11D 3/3765 |
| 9,944,570 B1 | 4/2018 | Basom et al. | |
| 2007/0027119 A1 | 2/2007 | Ahmed et al. | |
| 2009/0245939 A1 * | 10/2009 | Burns | ........................ B09C 1/08 |
| | | | 524/436 |
| 2011/0110882 A1 | 5/2011 | Preiss-Bloom et al. | |
| 2013/0023648 A1 | 1/2013 | Wnek et al. | |
| 2017/0158537 A1 | 6/2017 | Buschmann | |

FOREIGN PATENT DOCUMENTS

| | | | |
|---|---|---|---|
| JP | 2015517984 A | 6/2015 | |
| WO | 2014144214 A2 | 9/2014 | |

OTHER PUBLICATIONS

Kulkarni et al. "Urea-formaldehyde Crosslinked Starch and Guar Gum Matrices for Encapsulation of Natural Liquid Pesticide [*Azadirachta Indica* A. Juss. (Neem) Seed Oil]:Swelling and Release Kinetics" Journal of Applied Polymer Science, vol. 73, 2437-2446, 1999 (Year: 1999).*

Riyajan et al. "Development of a controlled release neem capsule with a sodium alginate matrix, crosslinked with glutaraldehyde and coated with natural rubber" Polymer Bulletin vol. 63, pp. 609-622, 2009 (Year: 2009).*

Yang et al. "Polymeric coatings for surface decontamination and ecofriendly volume reduction of radioactive waste after use" Progress in Nuclear Energy, vol. 104, pp. 67-74, available online Sep. 2017 (Year: 2017).*

Yi et al. "Encapsulating Fe3O4 into calcium alginate coated chitosan hydrochloride hydrogel beads for removal of Cu(II) and U(VI) from aqueous solutions" Ecotoxicology and Environmental Safety, vol. 147, Jan. 2018, pp. 699-707 (Year: 2018).*

Anpilogova, G. & Murinov, Yu. (2004). Composition and Properties of Water-Soluble products Formed in the Reaction of Chitosan with Fe(III) in Aqueous FeCl3 Solutions. Russian Journal of Applied Chemistry. 77. 1862-1868. 10.1007/s11167-005-0177-3.

PubChem [Internet]. Bethesda (MD): National Library of Medicine (US), National Center for Biotechnology Information; 2004 -. PubChem Compound Summary for CID 517045, Sodium Acetate; [cited Oct. 23, 2023.]. Available from: https://pubchem.ncbi.nlm.nih.gov/compound/Sodium-Acetate.

* cited by examiner

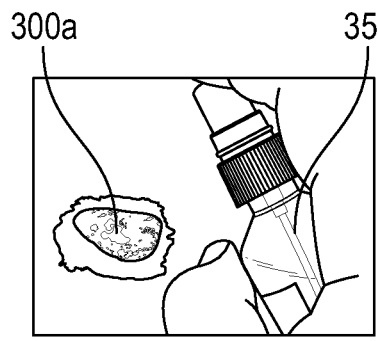 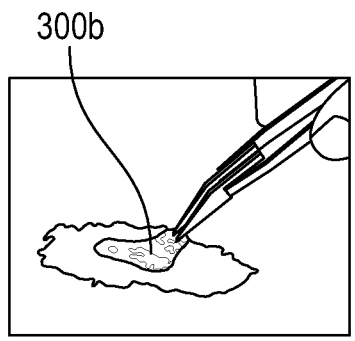 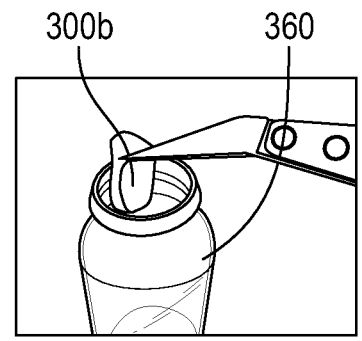
FIG. 4D  FIG. 4E  FIG. 4F
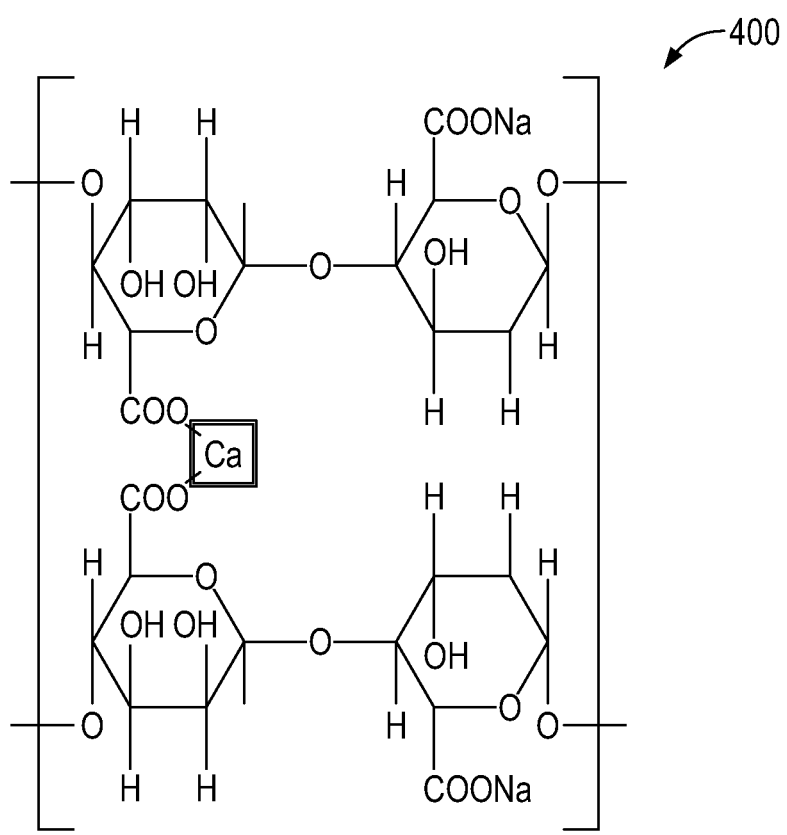
FIG. 5

Impact Sensitivity
- Measures the height or energy at which the material detonates 50% of the time Friction Sensitivity
- Measures the minimal threshold force of initiation Electrostatic Discharge
- Measures the minimum threshold for electrical initiation

|  | TATP | TATP w/SCHMOO |
|---|---|---|
| Impact | 30.0 ± 4.3 cm | > 305 cm* |
| Friction | 0.39 N | 59.8 N |
| ESD | 2.8 mJ | 46 mJ |

FIG. 6

POLYMER IMMOBILIZATION MATRIX FOR CONTAINMENT OF HAZARDOUS MATERIALS AND METHODS OF USING THE SAME

CROSS REFERENCE TO RELATED APPLICATIONS

This application is a Divisional Application of U.S. patent application Ser. No. 16/817,770, filed Mar. 13, 2020, which is related to and claims benefit of U.S. Provisional Patent Application No. 62/837,520, filed on Apr. 23, 2019, entitled "POLYMER IMMOBILIZATION MATRIX FOR CONTAINMENT OF HAZARDOUS MATERIALS AND METHODS OF USING THE SAME," hereby incorporated by reference in entirety.

BACKGROUND OF THE DISCLOSURE

The present invention generally relates to materials and methods for rendering hazardous materials inert, or less hazardous, so that they can be handled or disposed of properly.

Many hazardous or dangerous materials present themselves as powders or crystals. These materials could be unknown chemicals, unknown drug substances, biological agents, chemical warfare agents, explosive materials, etc. When such a material is discovered in a public place, and the materials are perceived to be a threat, it is the job of first responders to remove the materials without further threat to the public. If the material is an explosive, there is an immediate need render the explosive inert, or unable to initiate while handling or in transport. Current strategies for handling and removal of such materials include sending in a robot, or suited person, to isolate and move the material to a heavy-walled transport container. If the material is perceived to be of high sensitivity, sometimes the decision is to burn the material in place. If the material is perceived to be a biological threat, the protocol is much more rigorous to ensure it is not inadvertently dispersed throughout the area.

With the rise in contact-hazard materials, such as fentanyl or other harmful narcotics, there is an urgent need for new materials and methods of safe handling, storage, and if necessary, destruction. Identification of the aforementioned hazardous materials may be difficult or impossible given minimal resources in the field. Therefore, it is critical to have a solution that is universally effective at immobilizing all of these hazardous materials in a variety of settings.

SUMMARY OF THE INVENTION

The present disclosure describes a unique, two-part water-soluble polymer matrix material, and a method of application of the two-part water soluble matrix material that immobilizes a wide variety of hazardous materials and renders them "safe" or at least "safer" for handling and transport.

The instant polymer matrix material can be a two-part polymer material comprising a liquid or gel cross-linking polymer (hydrogel) and a cross-linking agent or initiator contained in a solution. The cross-linking agent functions to cross-link the polymer and cause it to harden in place.

The cross-linking polymer can, initially, be in a liquid or viscous gel form, and when applied to a hazardous loose powder, or crystals, permeates the loose material to isolate it from its surroundings. The liquid or gel can, in some embodiments, be viscous enough to remain in a localized area and not spread too thin. The cross-linking agent can then be sprayed onto the polymer to harden the polymer on-site to create a mass that can be more easily handled. Hardening of the polymer immobilizes the powder or crystals and isolates the powder or crystals from each other. In the case of an explosive, this physical separation significantly reduces the risk of accidental initiation of an explosive although it likely could be detonated with some effort. If the powder or crystal is a biological or drug threat, the immobilization can prevent air volatilization or scattering of the material. Once immobilized, the material (explosive, drug, or biological) can be safely transported, and a portion (the matrix can be cut or broken up) can be sent to an analytical facility for testing.

The present materials are thus effective for desensitizing explosive materials to reduce hazards of electrostatic discharge initiation, physical initiation by friction or physical impact, and also effective for isolating and immobilizing drug, biological, and chemical materials, including volatile chemical materials, from human contact.

The present materials and methods can be safely, effectively, and inexpensively deployed by bomb squads, hazmat teams, military, and law enforcement officers to reduce localized hazardous material threats and permit safer storage of such materials.

BRIEF DESCRIPTION OF THE DRAWINGS

While the specification concludes with claims particularly pointing out and distinctly claiming particular embodiments of the instant invention, various embodiments of the invention can be more readily understood and appreciated from the following descriptions of various embodiments of the invention when read in conjunction with the accompanying drawings in which:

FIGS. 4A-F illustrates an exemplary method of application of the part one hydrogel to a hazardous material and further application of the part two cross-linking agent to harden the material for removal;

FIG. 5 chemically illustrates an example of the cross-linking action when the cross-linking agent is applied to the part one polymer material;

FIG. 6 illustrates exemplary testing of the reduced sensitivity of an explosive material treated with the present immobilization material.

DETAILED DESCRIPTION OF THE EXEMPLARY EMBODIMENTS

Figure 1A:
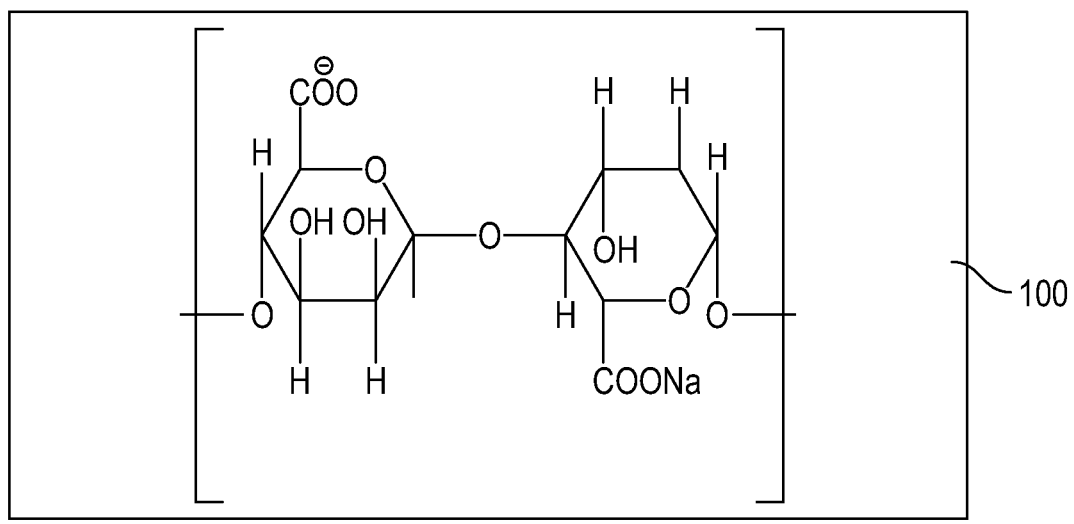
FIGS. 1A and 1B illustrate one exemplary formulation for the instant two-part, water soluble polymer matrix materials.

Referring now to the drawings, exemplary embodiments of the invention are generally described and illustrated in the attached figures.

Referring to FIGS. 1-7, the present disclosure teaches a novel two-part, water soluble polymer matrix material and a method of application that immobilizes a wide variety of hazardous materials and renders them "safe" or at least "safer" for handling and transport.

Referring to FIGS. 1-7, the present disclosure teaches a novel two-part, water soluble polymer matrix material and a method of application that can immobilize a wide variety of hazardous materials and renders them "safe" or at least "safer" for handling and transport. The instant two-part material thereby renders otherwise unsafe materials transportable to aid in protecting the public, or other officials, by removing them from areas which the public would otherwise have access to.

Figure 1B:
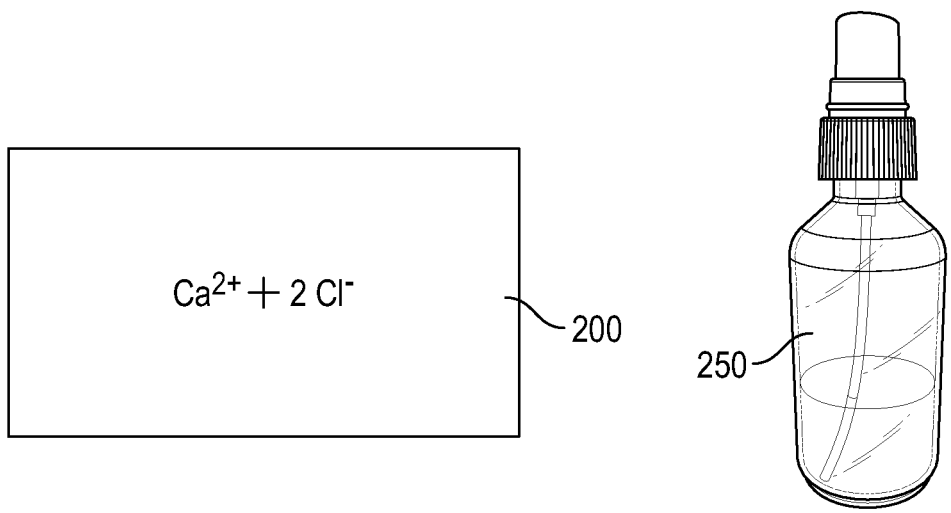

Referring to FIGS. 1A and 1B, the polymer matrix material in general can be a two-part polymer material comprising a liquid or gel cross-linking polymer (hydrogel) 100 and a cross-linking agent or cross-linking initiator 200 contained in a sprayable solution in a spray container 250. The cross-linking agent 200, when combined with the polymer material 100, can function to immediately cross-link the polymer 100 and cause it to harden in place. Once hardened, the potentially offending material can thus be rendered "inert" such that it can be deemed less of a threat and no longer be inhaled, exploded, or otherwise endanger those in the area.

Part One (Hydrogel Polymer)

Figure 2A:
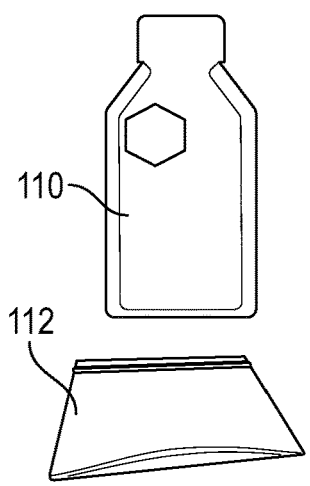
FIG. 2A-C illustrates exemplary form factors for the part one hydrogel materials.
Figure 2B:
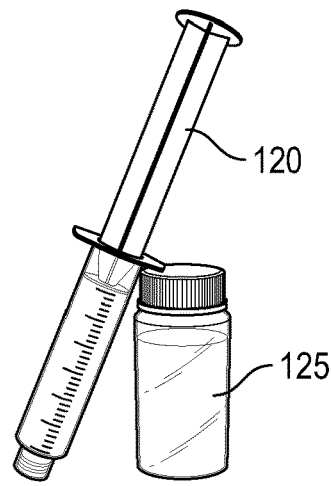
Figure 2C:
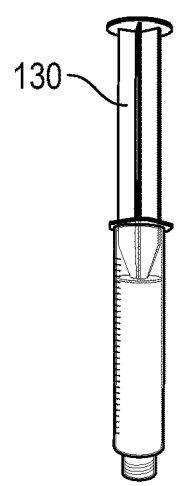

The first part of the instant two-part material can generally include various water-soluble polymers, such as polyvinyl alcohol, agar, gelatin, and sodium alginate. Such materials 100 were found to be suitable for use as Part One of the instant material. An exemplary, but not exhaustive, list of suitable polymers is set forth in Table 1 below. The polymer can preferably be in a ready-to-use liquid or gel form 110, shown in FIG. 3A, but can also be provided in a powder form 112 to be mixed with water or other appropriate solvent (ethanol/methanol) at the time of use. Alternatively, the polymer can be provided in a concentrate form in a syringe 120, to be mixed with water or other solvent 125 at the time of use, as shown in FIG. 2B. Examples of gel concentrate and ready-to-use materials are illustrated in FIG. 2C in a syringe 130.

TABLE 1

| Polymer | Crosslinker |
| --- | --- |
| Poly Vinyl Alcohol | Sodium Borate, Boric Acid, and Glyoxal |
| Starch | Glyoxal |
| Cellulose | Glyoxal |
| Protein and Gelatin | Glyoxal |
| Agarose and chitosan | Oxidized dextrin |
| Chitosan | Glutaraldehyde |
| Guar Gum | Epichlorohydrin |
| Gellan gum | Endogen Polyamine spermidine |
| Glycol Chitosan | Oxidized Alginate |
| Hydroxamated alginates | +2 and +3 Metal Cations |
| Scleroglucan | Borax |
| Poly (acrylic-co-vinylsulfonic) acid | Ethylene glyco dimethacrylate |
| Polyacrylamide | N,N'-methlynebisacrylamide |
| Polyacrylamide/guar gum graft copolymer | Glutaraldehyde |

Figure 3A:
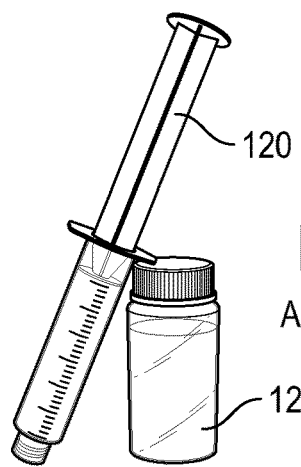
FIG. 3A-C illustrates an exemplary preparation of the part one hydrogel material from a concentrate material formulation.
Figures 3B, 3C:
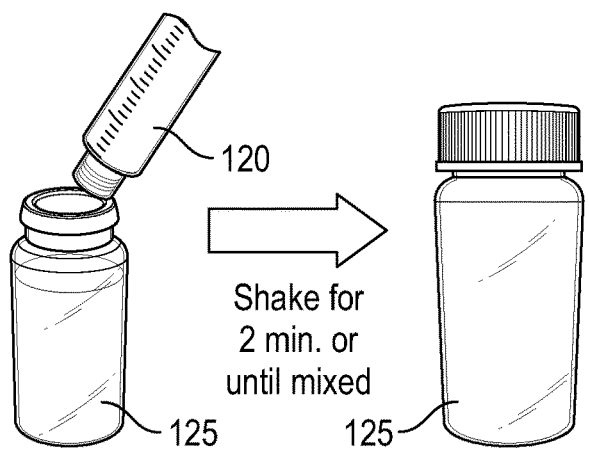

In one example, FIG. 3A illustrates one exemplary method of mixing a concentrated hydrogel polymer 120 into a water 125 for use in the field. In a preferred exemplary composition, a solution of water, sodium alginate, and an organic solvent can be combined. The percent of sodium alginate can vary depending on the form factor and in one use case can account for 1% to 20% percent of the total solution. Appropriate organic solvents can include, but are not limited to, methanol, ethanol, and isopropanol. The percent of organic solvent used can be between 1% to 50% percent with 5% to 20% being preferred of the total solution.

Once combined, the concentrated hydrogel polymer 120 and solvent 125, can be shaken for two minutes, or until mixed.

Part Two (Cross-Linking Agent)

Referring back to FIG. 1, an exemplary cross-linking solution 200 can include a metal salt with a cation of +2 or +3 charge. Appropriate examples of metal salts include, but are not limited to, calcium, zinc, iron, aluminum, copper, nickel, and magnesium salts with salts of calcium, zinc, and iron being preferred. The percent of salt in Part Two can vary between 10% to 50% of the total solution, with 15% being a preferred example. Other cross-linking agents can be used for different hydrogels, examples of suitable cross-linking agent are included in TABLE 1 above. The cross-linking agent 200 can preferably be deployed in a solvent as a sprayable material, in a spray bottle 250, for quick and easy application over a wide surface area.

In another exemplary embodiment, a biocide can be added to the cross-linking solution to retard the growth of any biological materials within the Part One composition. Biocides include but are not limited to calcium hypochlorite and sodium hypochlorite.

Figure 4A:
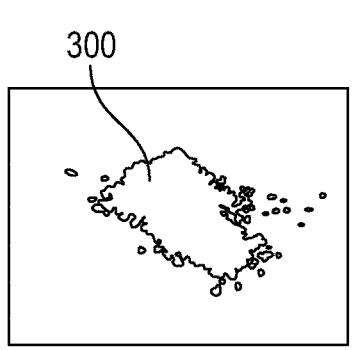
Figure 4B:
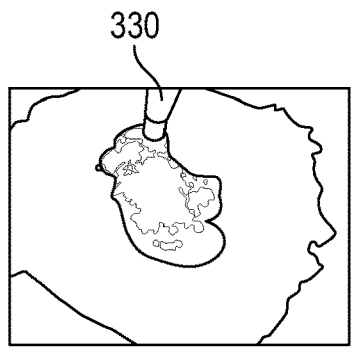
Figure 4C:
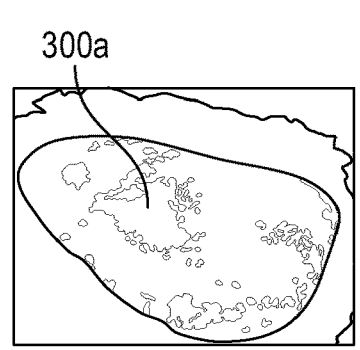

FIGS. 4A-F illustrate an exemplary embodiment of the chemical interaction and cross-linking of the polymer chains when the cross-linking agent is applied. In general, a hazardous material 300 can be found or identified by a member of the public or an official, as shown in FIG. 4A. An officer, agent or other first responder, can then determine that it is necessary to immobilize the aforementioned hazardous material 300 to protect themselves during removal or the public at large. As shown in FIG. 4B, the user can apply the Part One composition 330 to the target material until full coverage of the area of is achieved such that the hazardous material 300 is isolated, as shown in FIG. 4C. Once the hazardous material is isolated 300a, the user or first responder can then apply the Part Two composition 350 as shown in FIG. 4D, by the use of a spray bottle for example. After application of the Part Two composition 350, the Part One 330 and Part Two 350 compositions can be crosslinked 400 to harden the material, as shown in FIG. 5. After the cross-linking occurs, the now cross-linked polymer matrix 400 is hardened, as shown in FIG. 4E, and the encapsulated material 300b can be picked up and removed. In some embodiments, the process can be completed in a time frame of less than one minute. In some instances, the encapsulated and hardened hazardous material 300b can be placed in a sample container 360 for further testing in a lab like setting, as shown in FIG. 4F.

Advantageously, the solidified (encapsulated) explosive 300b can, as shown in FIG. 6, exhibit increased safety threshold margins. For example, the resultant hazardous material can have increased thresholds for initiation by electrical discharge (ESD), friction, and impact as compared to an explosive material (TATP) by itself. Testing of the instant two-part matrix material shows an insensitivity to impact initiation at maximum height of instrument, a 15 times improvement in electrostatic discharge initiation, and a 150 times improvement in friction initiation.

Figure 7A:
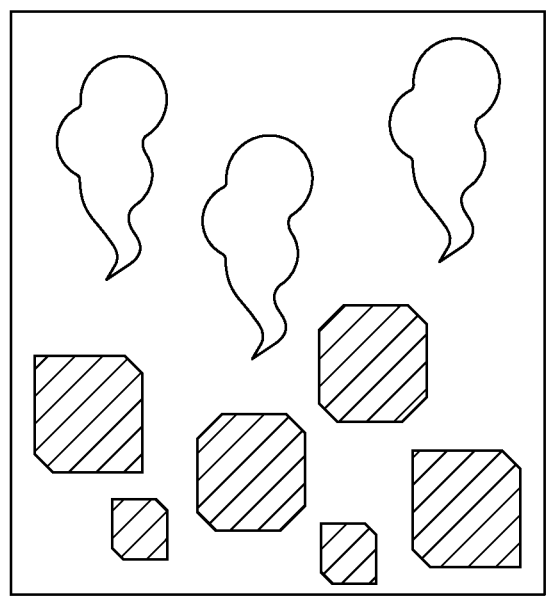
FIGS. 7a and 7b illustrate an exemplary use of the formulation to encapsulate and immobilize a volatile material.
Figure 7B:
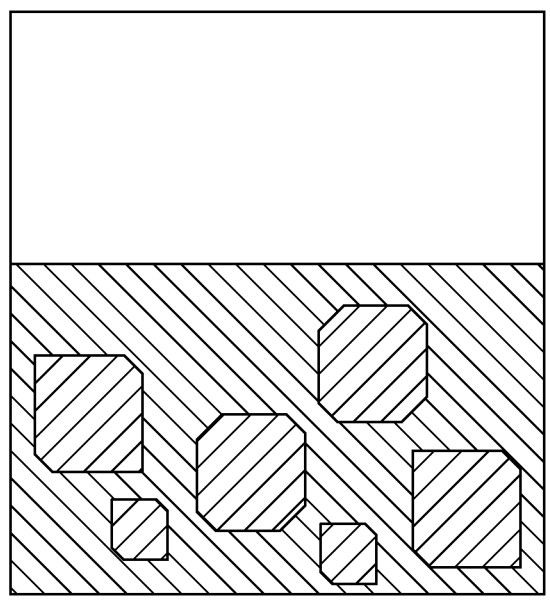

Turning to FIGS. 7A-7B, the polymer and initiation as described hereinabove can also be used to encapsulate volatile materials 500 which emit questionable and potentially dangerous fumes 502 into the surrounding air (FIG. 7A). Once the volatile materials 500 are encapsulated with the cross-linked matrix 400, the volatile material 500 may have a dramatically lower mobility and thus increase the ability to safely handle the material. 500 (FIG. 7).

While there is shown and described herein certain specific structures embodying various embodiments of the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed:

1. A method for a law enforcement officer, military, bomb squad, or other first responder to, in situ, immobilize a hazardous material selected from the group consisting of an explosive material or an illegal drug composition, comprising the steps of:
   identifying in a public space, by a law enforcement officer, military, bomb squad, or other first responder the hazardous material for immobilization;
   providing, as a ready to use, two-part, instant polymer matrix encapsulating material for immobilizing, in situ, said hazardous material, said polymer matrix encapsulating material comprising:
      a first formulation of a crosslinking polymer in a viscous liquid or viscous gel form, in concentrations less than 1% and as much as a fully saturated solution in solvent, said first formulation provided in a ready to dispense container; and
      a second formulation of a cross-linking agent, in a sprayable form, said second formulation provided in a ready to spray container;
   applying in situ, the first formulation to the hazardous material to substantially cover the hazardous material, said viscous liquid or viscous gel being capable of remaining in a localized area; and
   applying, in situ, the second formulation to the first formulation to cross-link and harden the polymer and immobilize the hazardous material.

2. The method of claim 1, further comprising the step of placing the immobilized hazardous material into a container for removal.

3. The method of claim 2, wherein the crosslinking polymer is selected from the group consisting of: Polyvinyl Alcohol (PVA), Starch, Cellulose, Protein and Gelatin, Agarose and chitosan, Chitosan, Guar Gum, Gellan gum, Glycol Chitosan, Hydroxamated alginates, Scleroglucan Poly (acrylic-co-vinylsulfonic) acid, Polyacrylamide, and polyacrylamide/guar gum graft copolymer.

4. The method of claim 3, wherein the cross-linking agent is a multivalent metal ion salt or an organic material.

5. The method of claim 4,
   wherein said cross-linking agent is said multivalent metal ion salt, and
   wherein said multivalent metal ion salt includes one of $AlCl_3$, $CuCl_2$, $CaCl_2$, $FeCl_3$, and $Zn(C_2H_3O_2)_2$.

6. The method of claim 4,
   wherein said cross-linking agent is said organic material, and
   wherein said organic material includes one of glyoxal, glutaraldehyde, and epichlorohydrin.

7. The method of claim 2, wherein the cross-linking agent is a multivalent metal ion salt or an organic material.

8. The method of claim 7,
   wherein said cross-linking agent is said multivalent metal ion salt, and
   wherein said multivalent metal ion salt includes one of $AlCl_3$, $CuCl_2$, $CaCl_2$, $FeCl_3$, and $Zn(C_2H_3O_2)_2$.

9. The method of claim 7,
   wherein said cross-linking agent is said organic material, and
   wherein said organic material includes one of glyoxal, glutaraldehyde, and epichlorohydrin.

10. The method of claim 1, wherein the crosslinking polymer is selected from the group consisting of: Polyvinyl Alcohol (PVA), Starch, Cellulose, Protein and Gelatin, Agarose and chitosan, Chitosan, Guar Gum, Gellan gum, Glycol Chitosan, Hydroxamated alginates, Scleroglucan Poly (acrylic-co-vinylsulfonic) acid, Polyacrylamide, and polyacrylamide/guar gum graft copolymer.

11. The method of claim 10, wherein the cross-linking agent is a multivalent metal ion salt or an organic material.

12. The method of claim 11,
   wherein said cross-linking agent is said multivalent metal ion salt, and
   wherein said multivalent metal ion salt includes one of $AlCl_3$, $CuCl_2$, $CaCl_2$, $FeCl_3$, and $Zn(C_2H_3O_2)_2$.

13. The method of claim 12, wherein the second formulation includes a biocide.

14. The method of claim 11,
   wherein said cross-linking agent is said organic material, and
   wherein said organic material includes one of glyoxal, glutaraldehyde, and epichlorohydrin.

15. The method of claim 11, wherein the second formulation includes a biocide.

16. The method of claim 10, wherein the second formulation includes a biocide.

17. The method of claim 1, wherein the cross-linking agent is a multivalent metal ion salt or an organic material.

18. The method of claim 17,
   wherein said cross-linking agent is said multivalent metal ion salt, and
   wherein said multivalent metal ion salt includes one of $AlCl_3$, $CuCl_2$, $CaCl_2)$, $FeCl_3$, and $Zn(C_2H_3O_2)_2$.

19. The method of claim 18, wherein the second formulation includes a biocide.

20. The method of claim 17,
   wherein said cross-linking agent is said organic material, and
   wherein said organic material includes one of glyoxal, glutaraldehyde, and epichlorohydrin.

21. The method of claim 17, wherein the second formulation includes a biocide.

22. The method of claim 1, wherein the second formulation includes a biocide.

* * * * *